(12) United States Patent
Murray et al.

(10) Patent No.: US 7,355,746 B2
(45) Date of Patent: Apr. 8, 2008

(54) METHOD AND APPARATUS FOR PRINTING AND/OR DISPLAYING DIGITAL IMAGES

(75) Inventors: Thomas J. Murray, Cohocton, NY (US); John R. Fredlund, Rochester, NY (US); Michael A. Morba, Rochester, NY (US); Charles W. Hicks, Rochester, NY (US); Lisa G. Woodworth, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 1250 days.

(21) Appl. No.: 09/975,903

(22) Filed: Oct. 12, 2001

(65) Prior Publication Data

US 2002/0109854 A1 Aug. 15, 2002

Related U.S. Application Data

(63) Continuation-in-part of application No. 09/249,573, filed on Feb. 12, 1999, now Pat. No. 6,574,373.

(51) Int. Cl.
H04N 1/40 (2006.01)

(52) U.S. Cl. .................................. 358/1.9; 382/254

(58) Field of Classification Search ................ 358/1.9, 358/2.1, 468, 3.27, 452; 382/254–269
See application file for complete search history.

(56) References Cited

U.S. PATENT DOCUMENTS

| 4,707,120 A | 11/1987 | Yamamoto |
| 4,714,962 A | 12/1987 | Levine |
| 4,816,874 A | 3/1989 | Terashita et al. |
| 4,862,200 A | 8/1989 | Hicks |
| 5,053,866 A | 10/1991 | Johnson |
| 5,469,209 A | 11/1995 | Gunday et al. |
| 5,619,257 A | 4/1997 | Reele et al. |
| 5,666,215 A | 9/1997 | Fredlund et al. |
| 5,667,944 A | 9/1997 | Reem et al. |
| 5,995,654 A | 11/1999 | Buhr et al. |
| 6,075,887 A | 6/2000 | Brett |
| 6,079,885 A * | 6/2000 | Sano ........................ 400/76 |
| 6,133,985 A | 10/2000 | Garfinkle et al. |
| 6,154,295 A | 11/2000 | Fredlund et al. |
| 6,204,940 B1 | 3/2001 | Lin et al. |
| 6,219,129 B1 | 4/2001 | Kinjo et al. |
| 6,233,069 B1 | 5/2001 | Buhr et al. |

FOREIGN PATENT DOCUMENTS

| EP | 0 377 386 A | 7/1990 |
| EP | 890 870 | 1/1999 |
| EP | 890870 A2 * | 1/1999 |
| EP | 1 028 351 A | 8/2000 |

* cited by examiner

*Primary Examiner*—Thomas D. Lee
*Assistant Examiner*—Stephen Brinich
(74) *Attorney, Agent, or Firm*—David A. Novais; Kathleen Neuner Manne

(57) ABSTRACT

A method and apparatus for printing and/or displaying a customer image order in which a digital record of a customer order containing a plurality of images is obtained. Digital enhancement is made to at least one of the plurality of images. The amount of digital enhancement made to each of the images enhanced is determined and a rating based on the amount of correction made to each image is obtained. The customer image order is printed with at least one enhancement print and one without any enhancement so that they can be compared.

25 Claims, 11 Drawing Sheets

METHOD AND APPARATUS FOR PRINTING AND/OR DISPLAYING DIGITAL IMAGES

CROSS-REFERENCE TO RELATED APPLICATION

This is a continuation-in-part of application Ser. No. 09/249,573, filed Feb. 12,1999 now U.S. Pat. No. 6,574,373 entitled "METHOD AND APPARATUS FOR PRINTING DIGITAL IMAGES" by Michael A. Morba, et al.

FIELD OF THE INVENTION

The present invention relates to the printing and/or display of images, and more particularly, the printing of digital images onto a media such as photosensitive media, inkjet media, thermal media, etc. and/or the electronic display of images.

BACKGROUND OF THE INVENTION

With the advent of digital printing onto media many more opportunities are provided for improving the quality of the output of the image. As an example, quality of the output of the image is particularly important wherein images are produced by printing on a photographic media such as photographic film. In prior art optical printers of photographic film, color adjustments are typically made to the exposure light in order to correct for color balance. With the advent of digital printing, various other enhancements and/or corrections may be provided for printing of images from film so as to compensate for poor flash or lighting during taking of the image by the camera, or other flaws caused by the camera or picture taker. Use of a digital printer also allows enhancements in sharpness and dust and scratch removal. Digital printers also permit corrections with respect to red-eye, tone scale, under exposure, and noise. However, with all these improvements, it is sometimes very difficult for the actual consumer to know and appreciate the benefit that has been or can be provided to the consumer.

Therefore, it is desirable to provide a method and apparatus whereby the consumer can more readily appreciate advantages provided by enhanced printing techniques used in printing of the images.

SUMMARY OF THE INVENTION

In accordance with one aspect of the present invention there is provided a method of printing a customer image order comprising the steps of: obtaining a digital record of a customer order containing a plurality of images; selecting at least one image from the plurality of images for printing as an unenhanced image and as a digitally enhanced image; digitally enhancing the at least one image; and printing the enhanced image and the unenhanced image.

In accordance with another aspect of the present invention, there is provided an imaging system which comprises an image data manager adapted to receive image data representative of a customer image order and select at least one image from the customer order for rendering as an unenhanced image and as a digitally enhanced image.

In accordance with another aspect of the present invention, there is provided a method of offering imaging services comprising the steps of: selecting at least one image from a customer order for rendering as an unenhanced image and as a digitally enhanced image; applying enhancement algorithms to the selected image to create the digitally enhanced image; and displaying the unenhanced image and the enhanced image on an electronic display.

In accordance with still another aspect of the present invention, there is provided a method of creating a comparison print comprising the steps of: placing an unenhanced image on a first portion of a print; and placing a digitally enhanced rendering of the same image on a second portion of the print.

In accordance with still another aspect of the present invention, there is provided a comparison print which comprises a first portion having an image thereon; and a second portion having a digitally enhanced rendering of the same image thereon.

In accordance with still another aspect of the present invention, there is provided a method of printing a customer image order comprising the steps of obtaining a digital record of a customer order containing a plurality of images; selecting at least one image from the plurality of images for printing as an unenhanced image and as a digitally enhanced image; and printing the digitally enhanced image and the unenhanced image.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed, in particular, to elements forming part of, or in cooperation more directly with, the apparatus in accordance with the present invention, it being understood that elements not specifically shown or described may take various forms well known to those skilled in the art.

Figure 1:
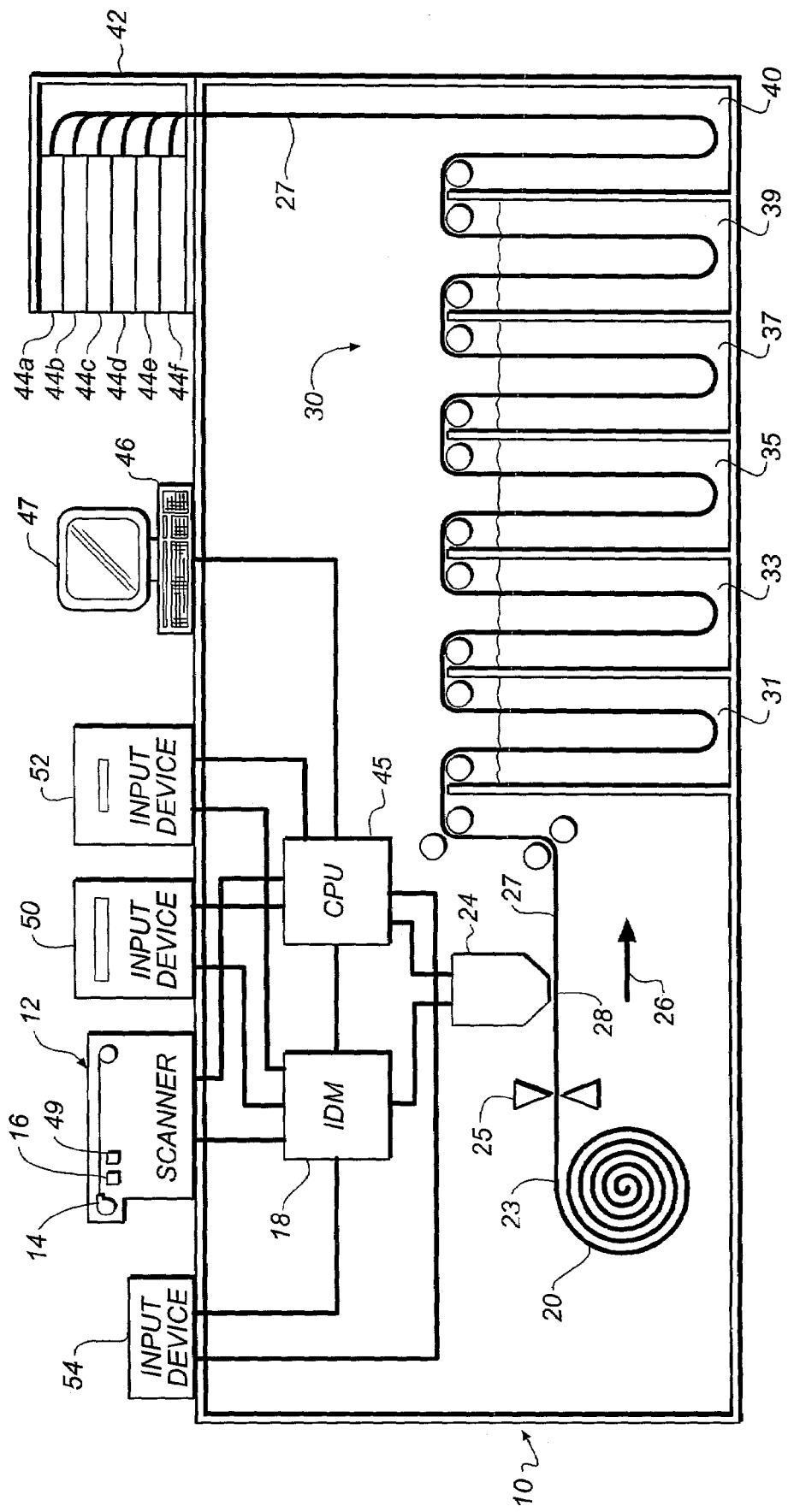
FIG. 1 is a schematic view of an apparatus made in accordance with the present invention.

Referring to FIG. 1, there is illustrated an apparatus 10 made in accordance with the present invention. In particular, the apparatus 10 is an apparatus designed to print digital images onto a photosensitive media (material). In particular, the apparatus 10 is of the type commonly referred to as a photographic minilab. As is typical with most minilabs, customer image orders are provided for printing of images onto a photosensitive media. A customer image order, for the purposes of the present invention, is a roll of developed photographic film or digital record file of a printing order containing a plurality of images thereon. In the particular embodiment illustrated, the apparatus 10 includes a scanner 12, which is designed to receive and scan a roll of developed film 14. The roll of developed film 14 is transported past sensor 16 in scanner 12 which scans the images on the film 14 so as to provide a digital record of the customer images.

The scanner 12 scans at a resolution sufficient to provide the desired quality prints. The scanner should scan at a resolution of at least 500×700 pixels per inch, generally at least 1000×1500 pixels per inch. Preferably the scanner 12 scans at a high resolution equal to or greater than about 2000×3000 pixels per inch. The digital record of the image is forwarded to an image data manager (IDM) 18 wherein the images are manipulated as preprogrammed. In the embodiment illustrated, IDM 18 comprises a computer (microprocessor) used for manipulation of the digital images contained in the digital record file. The IDM 18 includes a memory for storing of the digital record of the customer image order.

The apparatus 10 further includes a supply roll 20 containing a web of photosensitive media 23, which in the present invention comprises photographic paper. A cutting mechanism 25 is provided for cutting the web of photosensitive media into individual cut sheets. The mechanism 25 may cut the web into sheets having any desired lengths. Appropriate transport mechanisms, not shown, are provided for advancing of the cut sheets in the direction indicated by arrow 26 along processing path 27 through apparatus 10. In particular, the cut sheets are transported from cutting mechanism 25 to an exposure gate 28 whereby a digital printer 24 exposes the individual images of the customer image order onto individual cut sheets, respectively, as the pass exposure gate 28. In the particular embodiment illustrated, the digital printer 24 is a MLVA (Micro Light Valve Array) printer which scans a light containing image data onto cut sheets as they moves in the direction indicated by arrow 26 past exposure gate 28. Since printer 24 is a digital printer and the cutting mechanism 25 may cut the web of photosensitive media 23 into any desired length cut sheets, the images produced on cut sheets may be provided in a variety of different format sizes being constrained only by the printing capabilities of the printer 24 and width of the web of the photosensitive media 23. It is also to be understood that the printer 24 may be any appropriate digital printer, for example, a CRT printer, LED printer, LCD printer, laser printer or other type of digital printer that can print onto a photosensitive media. In the embodiment illustrated, the web of photosensitive media 23 comprises photographic paper, however, the media may comprise other media capable of being printed on by a digital printer. In the embodiment illustrated, the web of photosensitive media is first cut into individual cut sheets prior to printing, the present invention is not so limited. The digital images may be first printed on the web of photosensitive media 23 which at some later time before or after processing, is to be cut into individual cut sheets forming individual prints, each print being representative of a print of a single customer image.

As is typical with minilabs, the apparatus 10 is further provided with a processing section 30 wherein the cut sheets, after leaving exposure gate 28, are passed therethrough for development as is customarily done in such devices. In the particular embodiment illustrated, the cut sheets are passed through a developer station 31 containing a developer solution, a bleach/fix station 33 containing a bleach/fix solution, a plurality of wash stations 35, 37 and 39 each containing a washing solution, and through a dryer section 40 for drying of the photosensitive media. The individual prints of the images are then forwarded to sorter 42 wherein the prints for each customer image order are collated into separate bins 44a-f, each bin preferably receiving an individual customer image order. It is to be understood that any desired number of bins 44 may be provided as appropriate for the apparatus 10 and sorted in accordance with any desired sorting criteria.

As is customary, a CPU (computer) 45, is provided for controlling operation of the apparatus 10 and its various components. A user/operator interface 46, which includes a viewing screen 47, is also provided, for allowing an operator to enter instructions for operation of the apparatus 10 and monitor operation of the apparatus as is customarily done.

An appropriate computer printing program is provided for controlling operation of the IDM 18. The computer program is provided in an appropriate format which allows loading of the program into the apparatus 10 which causes the IDM 18 to perform the required steps. In particular, the computer program is designed so that the IDM 18 will first obtain and store a complete customer image order prior to printing. Appropriate enhancement algorithms, which have been preprogrammed into IDM 18, are applied to the customer image order so as to improve the overall aesthetic appearance of the images when printed. It is to be understood that any desired enhancements and/or corrections may be applied to the images. Within the context of the present invention, the process of producing a digitally enhanced image, as an example, can comprise changing pixel values to maximize content that is captured either on film or digitally. For example, but not by way of limitation, the following are a few of the enhancements that may be applied: contrast adjustment, red-eye removal, color balance, removal of dust marks or scratches and sharpness adjustments. In addition, custom corrections, such as crop and zoom, can be programmed or manually entered into the digital printer. After the stored digital images are enhanced, they are forwarded to the printer 24 for printing.

In order to better understand the operation of the present invention, a description of its operation will now be discussed. A customer image order is provided and forwarded to the photofinisher. This typically takes the form of an undeveloped or developed roll of film which is sent to the photofinisher. If the film is undeveloped, the photofinisher will develop the film as is customarily done in the art. Once the film has been developed, it is passed onto apparatus 10 wherein the images of the customer image order are scanned and forwarded onto the IDM 18. Appropriate image enhancement software programs, as previously discussed, are provided in the IDM 18 for analyzing the images and providing appropriate enhancements/corrections automatically to the images. After the appropriate image enhancements have been made to the images of the customer orders, a rating as to the amount of enhancement or correction made to each image is obtained. Within the context of the present invention, the amount of correction can refer to, but is not limited to, the number of types of corrections, the degree of the particular type of correction, weighted types (as will be described later) of corrections, or a combination of any of the above. For example, a single rating point may be given for each enhancement made. Thus, if an image is only enhanced by one feature such as sharpness, then it would be given a rating of one point, if two enhancements were applied to the image then the image would receive a rating of two points. Additionally, the rating assigned may depend on the type or degree of any one enhancement. Therefore, if an extensive amount of an enhancement or the enhancement of a particularly difficult type is applied, then it may be given a higher rating, for example two points. Therefore, each image obtains a rating in accordance with the amount of correction or enhancement that was made to that image. The greater the enhancement, the higher the rating. It is to be understood that the rating system may be constructed in any desired manner considered appropriate. The image which has reached a predetermined amount of enhancement is identified and tagged for printing as a comparison print. Preferably the image having the highest rating is printed as this would illustrate the most improvement. All the images of the customer image order are sent to printer 24 for printing. A comparison print of the tagged image is preferably printed adjacent the printed image which incorporates corrections. In this way, the consumer can easily compare the benefits that the enhancement has made to the image as originally captured.

Figure 2:
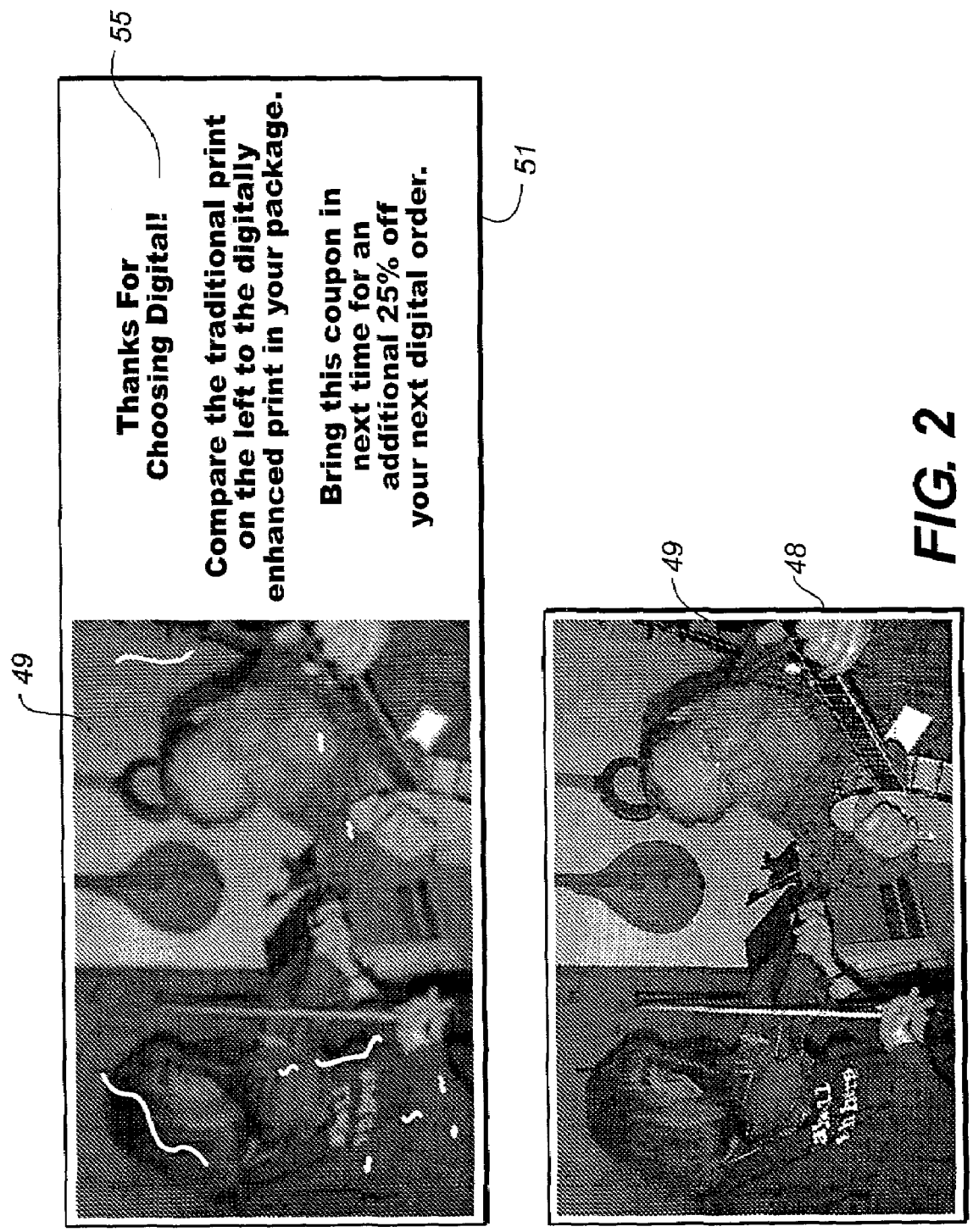
FIG. 2 illustrates two prints of the same image, one of which is a comparison print of the other.
Figure 3:
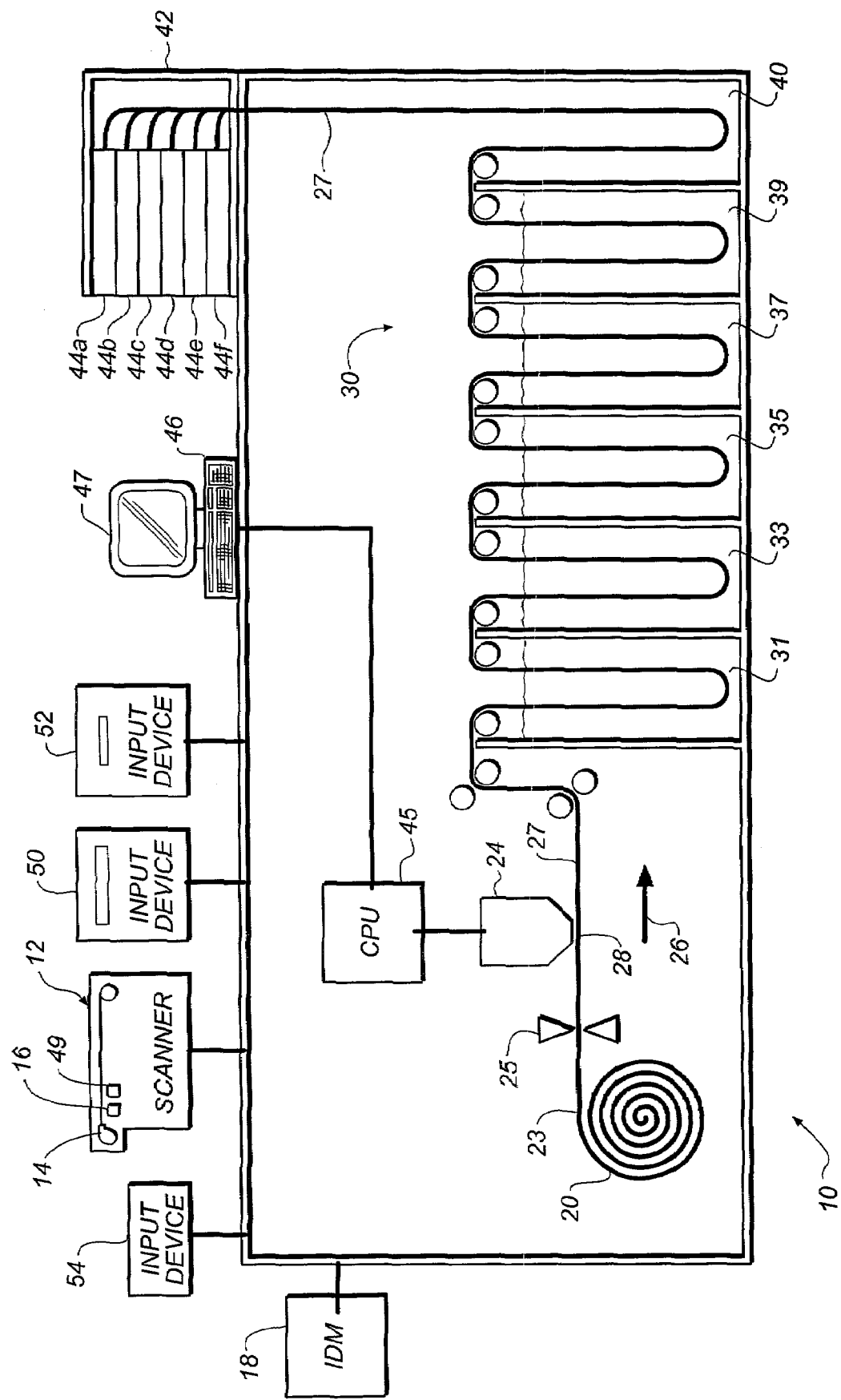
FIG. 3 is a schematic view of a modified system made in accordance with the present invention.

Referring to FIG. 2, there is illustrated a print 48 made in accordance with the normal printing algorithm of an image 49 and a comparison print 51 of image 49 made without the enhancement. While improvement in color balance, scene contrast cannot be adequately shown by these drawings. Improvement in sharpness and scratch removal can be observed. In the embodiment illustrated, appropriate information (text) 55 can be provided directly on print 51 telling the consumer that this is a comparison print made without any enhancements provided by the enhancement algorithms provided in the printer. As can be seen, text 55 may be placed on the comparison print 51 advising the customer of the benefits provided by this photofinishing source. As previously discussed, the comparison print is preferably placed adjacent the enhanced print 48, thereby providing a quick and easy comparison, however, the comparison print may be located at any desired place in the order. The text may be placed on the comparison print 51 or adjacent thereto and may include any desired statement by the operator, photofinisher, or retailer.

In an alternate embodiment of the present invention, instead of subjecting all of the images to the enhancement algorithms, it may be desirable that certain enhancements are applied only in premium printing service. Therefore, in this situation, images of the customer image order are reviewed to see which ones would most benefit from applying the enhancements to the image. The same system for rating the amount of enhancement could be used for rating of the images. The entire customer image order would be printed in its normal manner without the enhancements, however, the image which would have a predetermined amount of enhancement, preferably the image having most benefit from applying the enhancements, could be printed as a comparison print adjacent the normal print. Text, as previously discussed, may be provided on the comparison print stating that it is a comparison print which has incorporated certain enhancement features which could have been provided to the entire order. A certificate or discount coupon could be printed or otherwise provided with the returned prints to the consumer stating how the enhancement can be obtained in a reorder.

In the preferred embodiment illustrated, the enhancements to the images are applied automatically, however, an appropriate display screen on apparatus 10 may be provided for previewing of the images by an operator who can make custom enhancements/modifications to the images which can then be printed as a comparison print for forwarding to the consumer for providing of a comparison illustrating the benefits of ordering certain enhancements on this or any other image.

In the embodiments discussed above, the images for printing are obtained by scanning a developed roll of photosensitive film such as 35 mm or APS film. However, the present invention is not so limited. As illustrated in FIG. 1, the image data and the customer image order may be obtained from a variety of different sources (such as digital still cameras, the internet, etc.), whereby a customer image order may be submitted for printing, including providing of information of where the printed images are to be forwarded. For example, image input devices 50, 52, 54 may be provided wherein input device 50 may provide the images supplied on a CD, device 52 can be used to obtain images provided on computer disk, and a communication modem 54 may be provided to receive images over the internet, or from any other source that can forward digital images. Other digital input devices, such as a digital camera, may be used.

In the embodiment illustrated, the apparatus 10 does the printing, however, the present invention is not so limited. For example, the printing can be forwarded onto a different device for storage, printing and/or display. For example, the IDM 18 may forward the images through modem 54 to a customer or other device for providing and/or storing images. That is, the system of the present invention can be adapted to send images remotely via the internet to a customer's home computer, a remote printer or a selected location. Using the example of the internet, the original image as well as the enhanced image can be sent via the internet to the customer's home computer for the consumer's review. This would be particularly advantageous during the processing of the customer's order since it may provide the customer with an opportunity to order the enhanced image prior to the completion of his order by the service provider. A further advantage relates to the submission of electronic orders. More specifically, when a customer submits an order electronically, an enhanced image from a previous order can be displayed to the customer who would be identified by a specific code to remind the customer of the advantages of the enhancement algorithms.

In the embodiment illustrated in FIG. 1, the individual components are illustrated as a single apparatus 10. However, the present invention is not so limited. Referring to FIG. 2, there is illustrated a modified form of the present invention, like numerals indicating like parts and operation as previously discussed. In this embodiment, the scanner 12, IDM 18 and devices 50, 52, 54 are shown as separate individual components from the apparatus 10, which is used for printing of the images onto a photosensitive media. The operation and function of all the elements are the same except that individual elements are discrete elements that can be separate from each other and connected by appropriate communication lines as is well known to those of ordinary skill in the art.

In the embodiment illustrated, the processing of the photosensitive media is done by the apparatus 10. However, the present invention is not so limited. For example, the images may be printed on the web of photosensitive material 23 and forwarded in web form to a processor wherein the images are developed after which the developed web is forwarded onto a finishing station wherein the web is cut into individual prints and sorted by customer image order.

Figure 4:
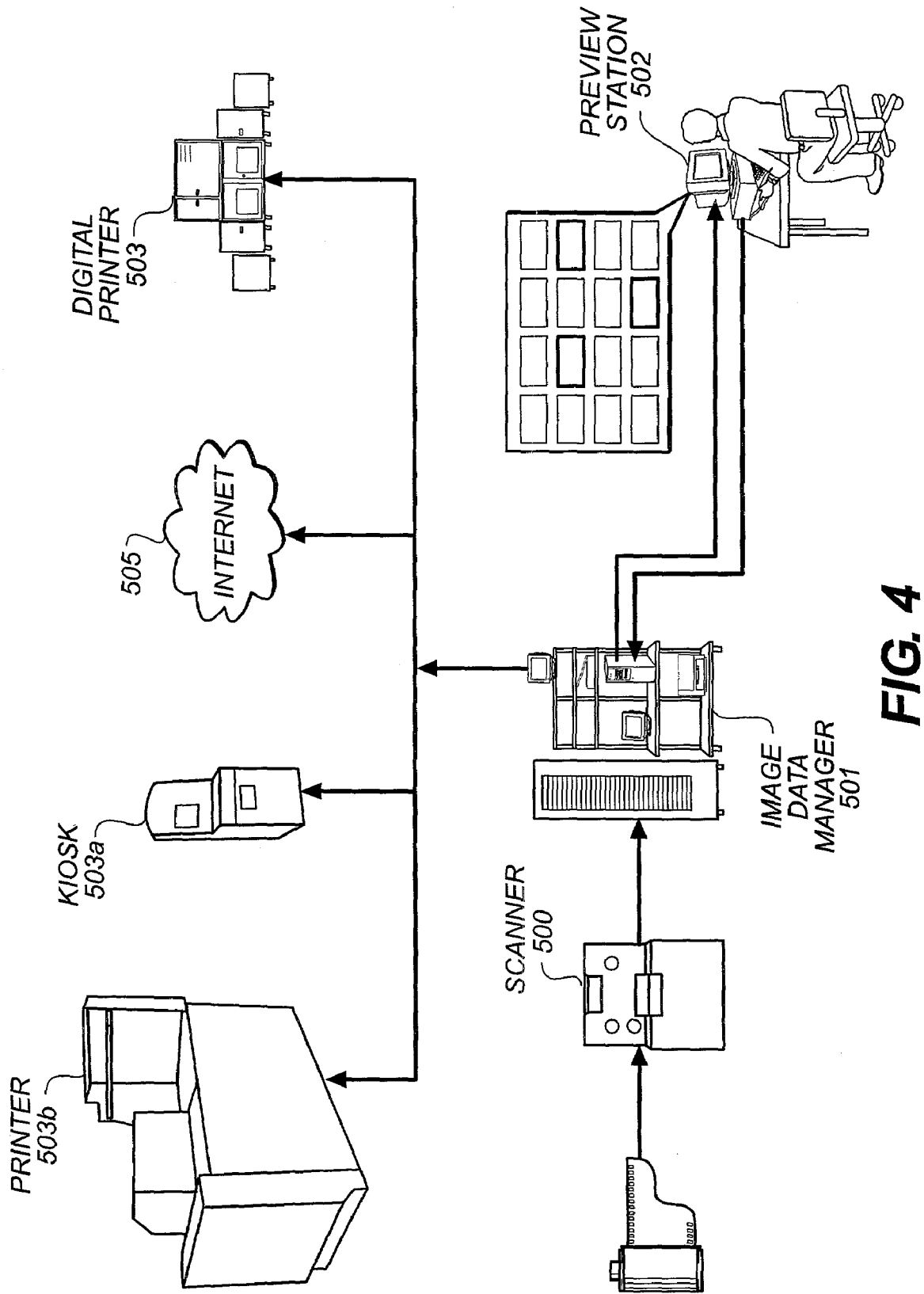
FIG. 4 schematically illustrates a processing or photofinishing system in accordance with the present invention.

The features of the invention can also be practiced in a wholesale lab environment, as illustrated in FIG. 4. As shown in FIG. 4, a customer order including film is scanned at a scanner 500. From there, the digital record of the images is processed at IDM 501, and optionally, an operator can preview images at a preview station 502. A digital printer 503 can be operationally associated with IDM 501 to produce service prints, index prints, etc, based on the customer order. As a further option, the images can be forwarded to a customer's home computer or some further remote location via an internet connection 505. As a still further option, the images can be forwarded to a kiosk 503a operationally associated with IDM 501 via a kiosk connection or to a remote printer 503b.

The following is an example detailing further features of the present invention, which is applicable to both a minilab and wholesale lab environment. Within the context of the present invention and using the lab schematic illustration of FIG. 4, a consumer order including at least, a roll of exposed photosensitive film would be received at the lab. The film would be scanned by scanner 500, and the digital record of the scanned images would be sent to image data manager 501. As a further option, the images can be electronically received by IDM 501 via, for example, the internet (an electronic order).

A first feature of the present invention involves image selection. That is, within the context of the present invention, the system can be adapted to use known computer and/or enhancement algorithms to automatically select a set of images from a consumer film or an electronic order that would have benefited or have benefited the most from image enhancement algorithms in image data manager 501. At this point, image data manager 501 can forward the images to preview station 502, and those images which have been selected with the most potential for image improvement can be highlighted so to be easily detectable by an operator at preview station 502. The operator can then elect to use one of the highlighted images to be used in a comparison print or can decide that the image is not to be used in a comparison print. Within the contexts of the present invention, IDM 501 would be adapted to render the customer's image(s) based on the work order as selected or requested by the customer. That image which has been selected for image enhancement, would be rendered by IDM 501 based on the customer's order and would be further rendered as an enhanced image. Thus, in the present invention, the same image is rendered as an unenhanced image (i.e. based on the customer's original order) and as an enhanced image where the IDM will apply enhancement algorithms to the image. For example, the image can be digitally enhanced by changing pixel values to maximize content that is captured either on film or digitally. As a further example, the unenhanced image can be a true optical print or a digitally rendered image to simulate an optical image, and the enhanced image can be digitally rendered with superior image quality as compared to the unenhanced image.

As a further option, rather than having an automatic selection of the images which have the most potential for improvement, the images can be sent by image data manager 501 to preview station 502 where the operator can manually select which images have the most potential for improvement.

With respect to image selection, those images which have the most potential for improvement can be images that include flesh tone, a face or people since these images traditionally have the most importance to photographers. As a further option, image selection can be based on predetermined criteria such as red-eye. With respect to red-eye, the red-eye can be detected in the image using known image algorithms, and if determined to be above a predetermined threshold, that image can be selected as an image which has the most potential for improvement.

As a further option, the images at image data manager 501 can be assigned a score as described above, based on different criteria. Those with higher scores can be tagged as images that have the most potential for image improvement.

As a still further option, image data manager 501 and/or the preview station operator can work on the basis of weighting factors. That is, some characteristics can have a higher weight number attached to it with respect to determining whether it has high potential for improvement. This is based on the fact that certain enhancement algorithms could contribute to the quality of an image or have more of a dramatic affect than others. For example, tone scale may have a larger weighting factor than sharpening. As an example, an algorithm can be set up in which tone scale is given a higher weighting factor, and in a decreasing level, characteristics such as exposure compensation, noise reduction and sharpening would have weighting factors lower than tone scale.

The image selection noted above can be based on threshold values. More specifically, if using only red eye detection as a basis for selecting an image, a threshold value for detected red eye could be used. If the amount of red eye detected is above the predetermined threshold, the image would be selected for image enhancement. A threshold value can also be set up with respect to the above-mentioned weighting factors. That is, as a first option, a predetermined threshold value can be set up based on all of the characteristics noted above. In this scenario, if the value of the detected tone scale, exposure composition, noise reduction, sharpening, etc., exceeds a predetermined total threshold value, that image would be selected for image enhancement. As another possibility, each characteristic would have a predetermined threshold value such that when the characteristic has a detected value larger than the threshold value, it would be tagged as an image suitable for image enhancement.

In a situation in which the system automatically selects which image has the most potential for image improvement, other factors in addition to the weighting factor and score noted above can be utilized. For example, in general, those images which include people or faces generally have more meaning to a customer or consumer. Therefore, as noted above, the system can be set up to detect flesh and/or scenes with human faces using image processing algorithms. These images could be examined for characteristics noted above, such as red-eye, to see if they would qualify as images with the most potential for improvement. As an option, red eye can be used as the sole criteria for image selection or red eye can be added as a further criteria for weighting factor or scoring consideration. If red eye is added as a weighting factor criteria, those images having red-eye detected can be given a higher weighting factor value than images without red-eye detected. Therefore, in this embodiment, an image can be selected either by image data manager 501 or by an operator at preview station 503 based on characteristics of the image. These characteristics could include features such as red-eye, tone scale, underexposure compensation, noise reduction and sharpness. Each of the characteristics is assigned a predetermined weighting factor and the image selected for enhancement (either by the IDM or the operator) would have a total weighting factor that would be above a threshold value.

With respect to the predetermined threshold levels as discussed with regard to selecting an image, the threshold levels as defined, can be predetermined values with regard to characteristics such as red-eye, sharpness, contrast, etc. Of course, threshold levels can be established based on other factors such as a preference by the consumer; the type of service provider; the region where the consumer is located; the lab where the order is being processed; the type of print; the print content (for example, is the print representative of an outdoor scene or an indoor scene); or on the print format.

In general, image characteristics that could be used to select images for enhancement or the comparison print could include flesh or a face detected in the scene as described above. Further image characteristics could include but are not limited to:

a) film type used (some film types are more susceptible to imaging faults than others;

b) out of focus images which have the potential to be sharpened;

c) high noise or grain detected in the scene using a noise metric that could tell you the degree of noise and whether it was objectionable or acceptable noise;

d) image recognition algorithms that could detect the most pleasing image content (centered images, cropped appropriately, of subject matter that is most commonly understood to be of high value to most customers, i.e. pictures of people, animals, garden scenes, etc.);

e) if red-eye was detected in the scene, the largest eyes detected in the scene would be indicated on the comparison print using data like the distance between the red-eye pair, f) severity of red-eyes—a score from the image algorithm would indicate how 'bad' the red-eye is—highly saturated red or muted red;

g) orientation of the incoming image would indicate which template to use, if it was a vertical shot then the vertical comparison print would be used, if it was a landscape shot then a horizontal comparison print would be delivered;

h) camera type used—if the system understood that a particular camera was used to expose the images then certain characteristics of that camera could be useful for the selection of the comparison—exposure levels, lens fall off characteristics, flash fall off characteristics, lens geometric distortion characteristics;

i) under water scenes detected;

j) artificial illuminant scenes detected;

k) scratch detection—show before and after scratch removal; and l) 'glint' detection (this is similar to red-eye but is the reflection of the camera flash off of an individuals glasses.

In a further feature of the invention, the weighting factor, score, threshold values, etc., as discussed above can be used by IDM 501 or a preview operator to generate messages for the consumer or customer. For example, IDM 501 or the preview operator can assign or determine a value representative of the amount of image enhancement to the selected image and generate and/or determine a message for transfer to, for example, the customer's computer, or for printing on the comparison print based on the value. As an example, if tone scale was the biggest contributor to the score or value, the generated message could reference the shadow detail, etc. If underexposure compensation was a big contributor, then the generated message would reference the underexposed areas, etc. The message could be in the form of text messages, Emails, print media, etc., or can be provided in association with the enhanced image on the comparison print or separately.

In addition, in this embodiment, an image can be disqualified from being selected by image data manager 501 or by an operator at preview station 503 based on characteristics of the image. These characteristics could include objectionable image artifacts such as high grain or scratches, out of focus images, image content characteristics that are not conducive to a good comparison (e.g. a poorly composed image), inappropriate image content (i.e., offensive scenes) or uninteresting image content such as pictures of feet or ceilings instead of pictures of people or places.

Once the image having the most potential for improvement has been detected using the factors noted above, the print along with the remaining prints of the order can be printed by way of digital printer 503 or remote printer 503b, electronically sent (for example, the internet) to the consumer or customer for display on his/her personal computer, or sent to kiosk 503a for display on the computer or display of the kiosk. With respect to the creation of prints, the customer order including the service prints, the comparison print and the index print are printed on media. Within the context of the present invention, the service prints would be the normal prints as requested by the customer in his/her order, while the comparison print would include the unenhanced image (or the image rendered as requested in the customer order), and the same image adjacent thereto which is rendered as a digitally enhanced image. As a further option, the comparison print can include only the enhanced image or a portion of the enhanced image highlighting the enhancement.

Figure 5A:
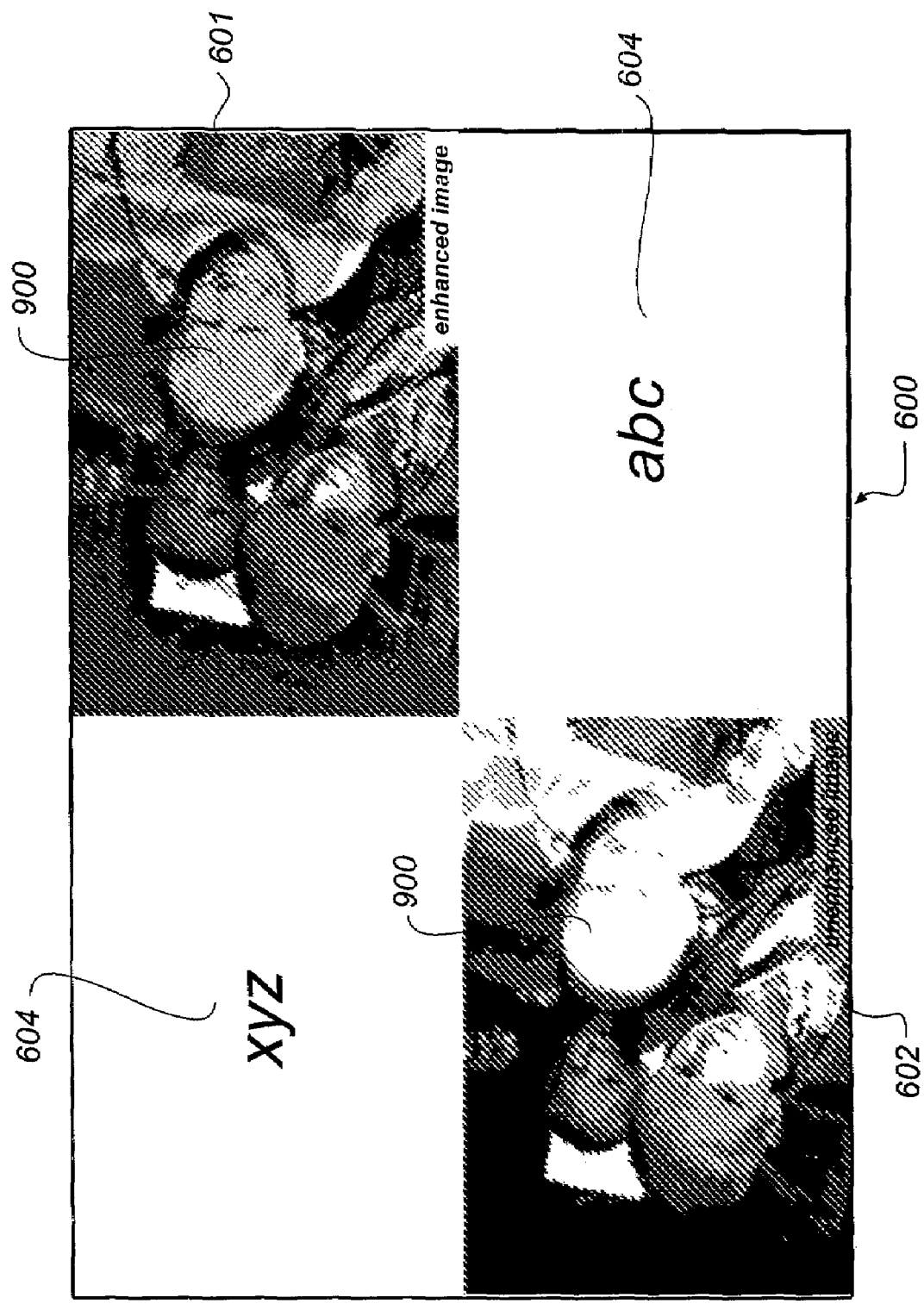
FIGS. 5A-5B illustrate an example of a comparison print in accordance with a feature of the present invention.
Figure 5B:
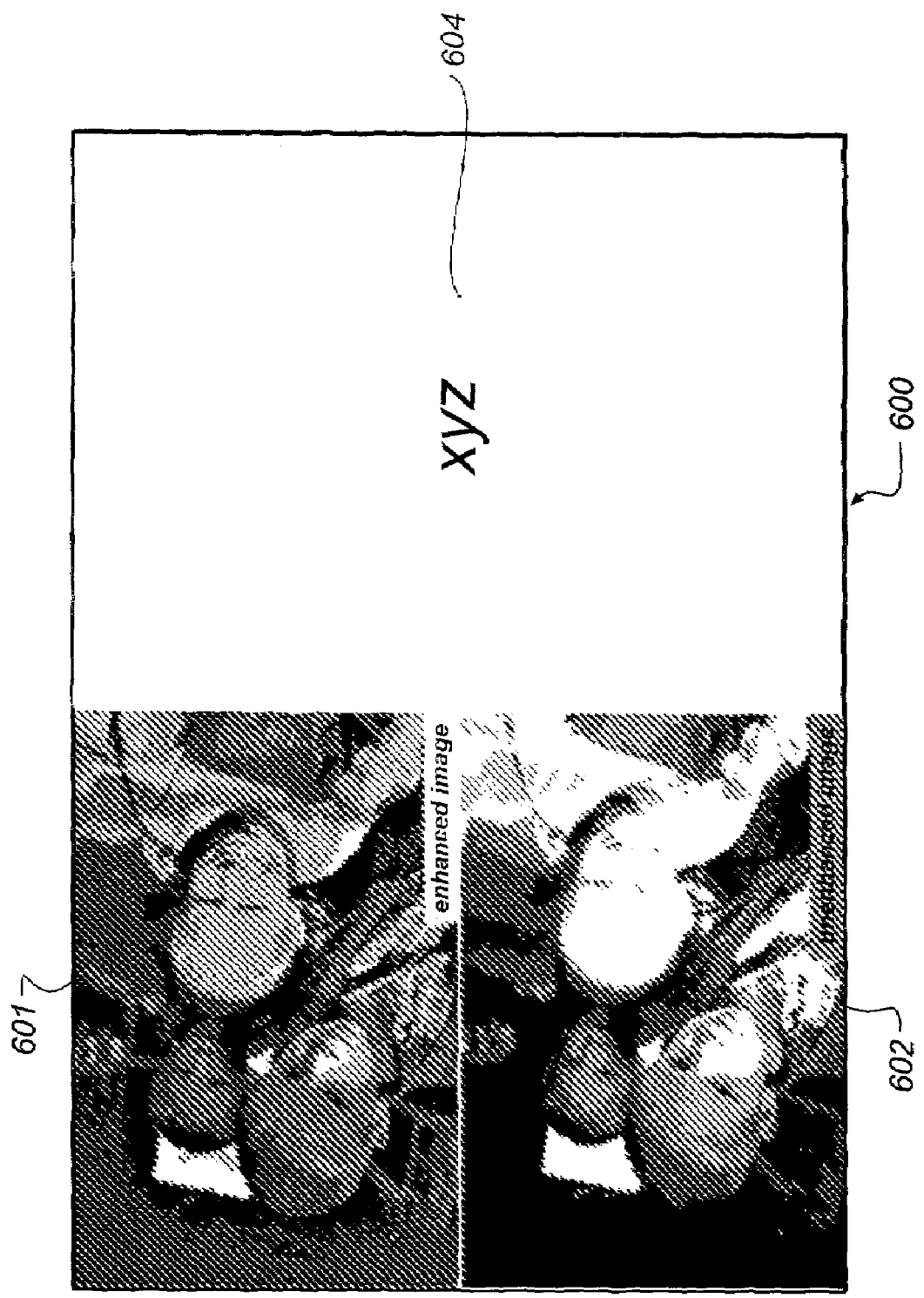
Figure 5C:
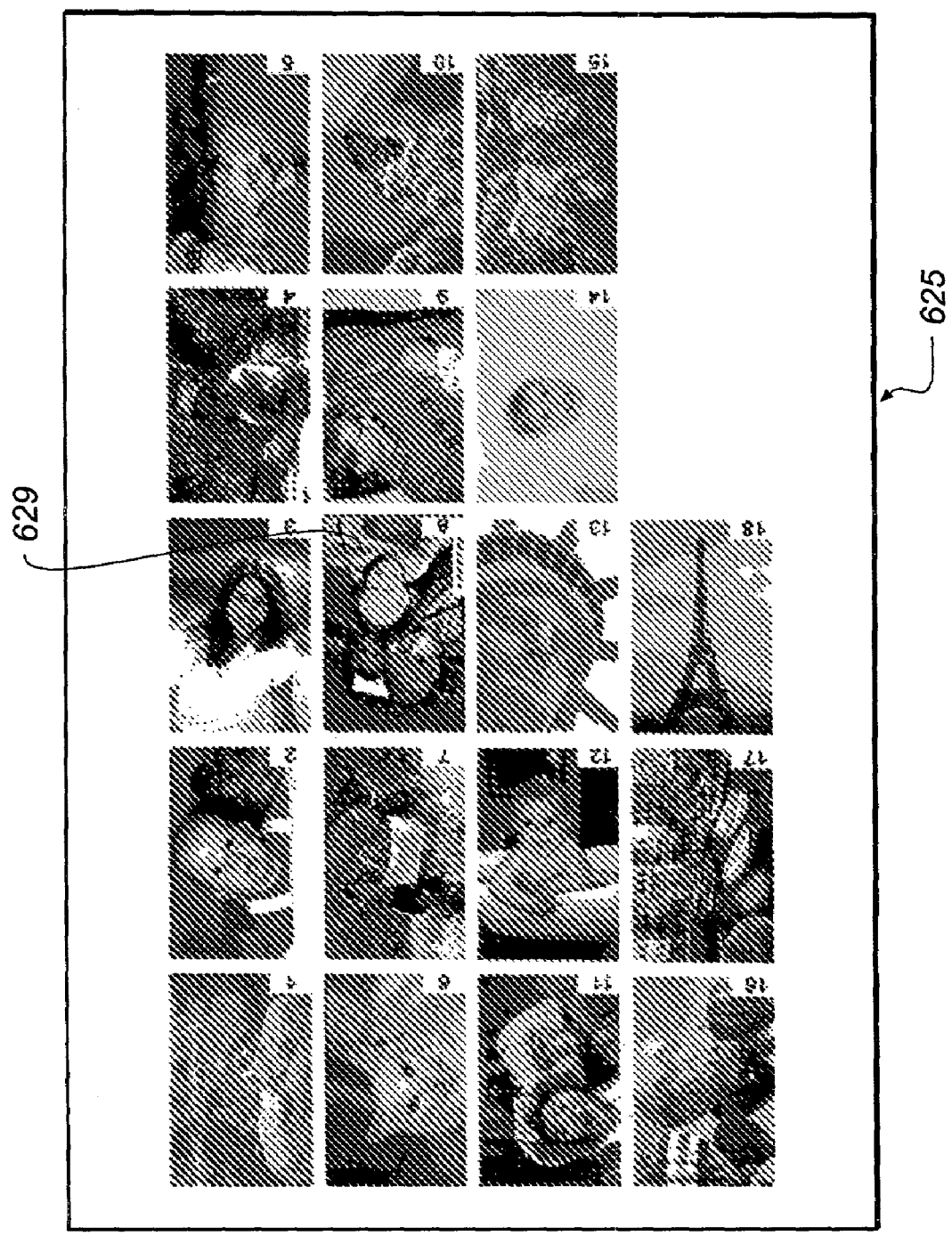
FIGS. 5C-5F show further examples of comparison prints in accordance with the invention.
Figure 5D:
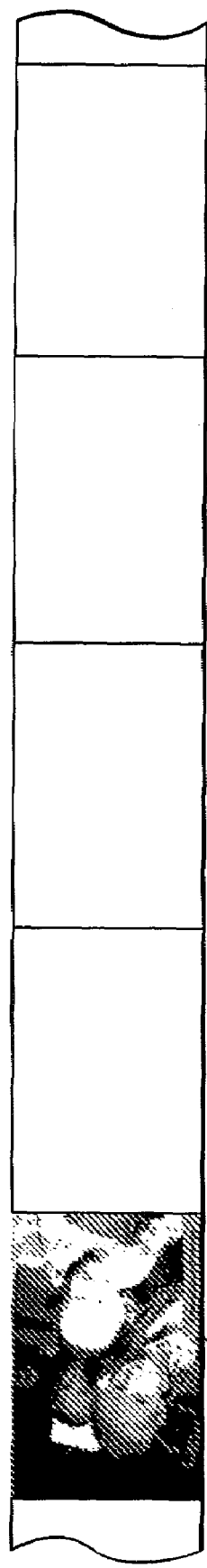
Figure 5E:
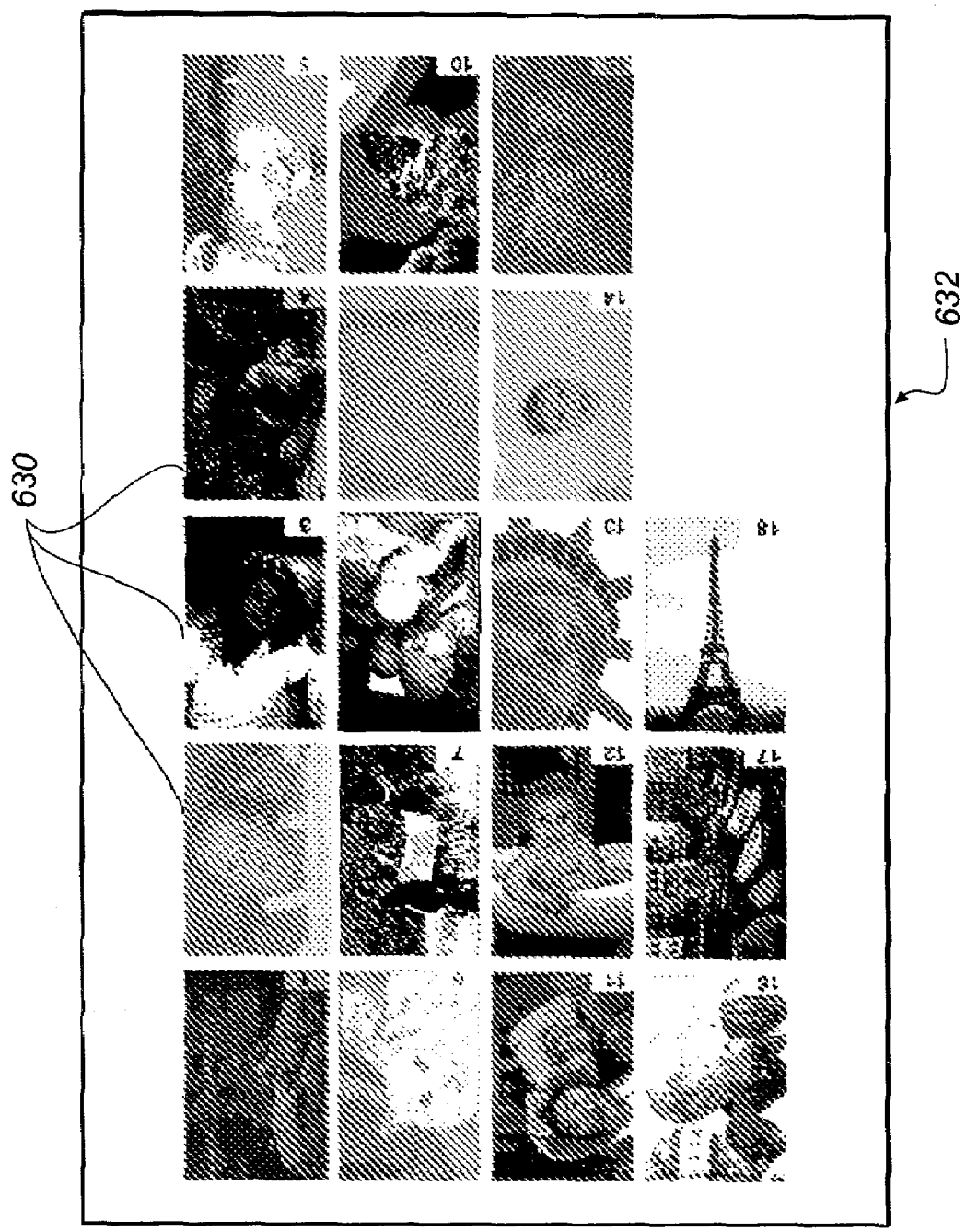
Figure 5F:
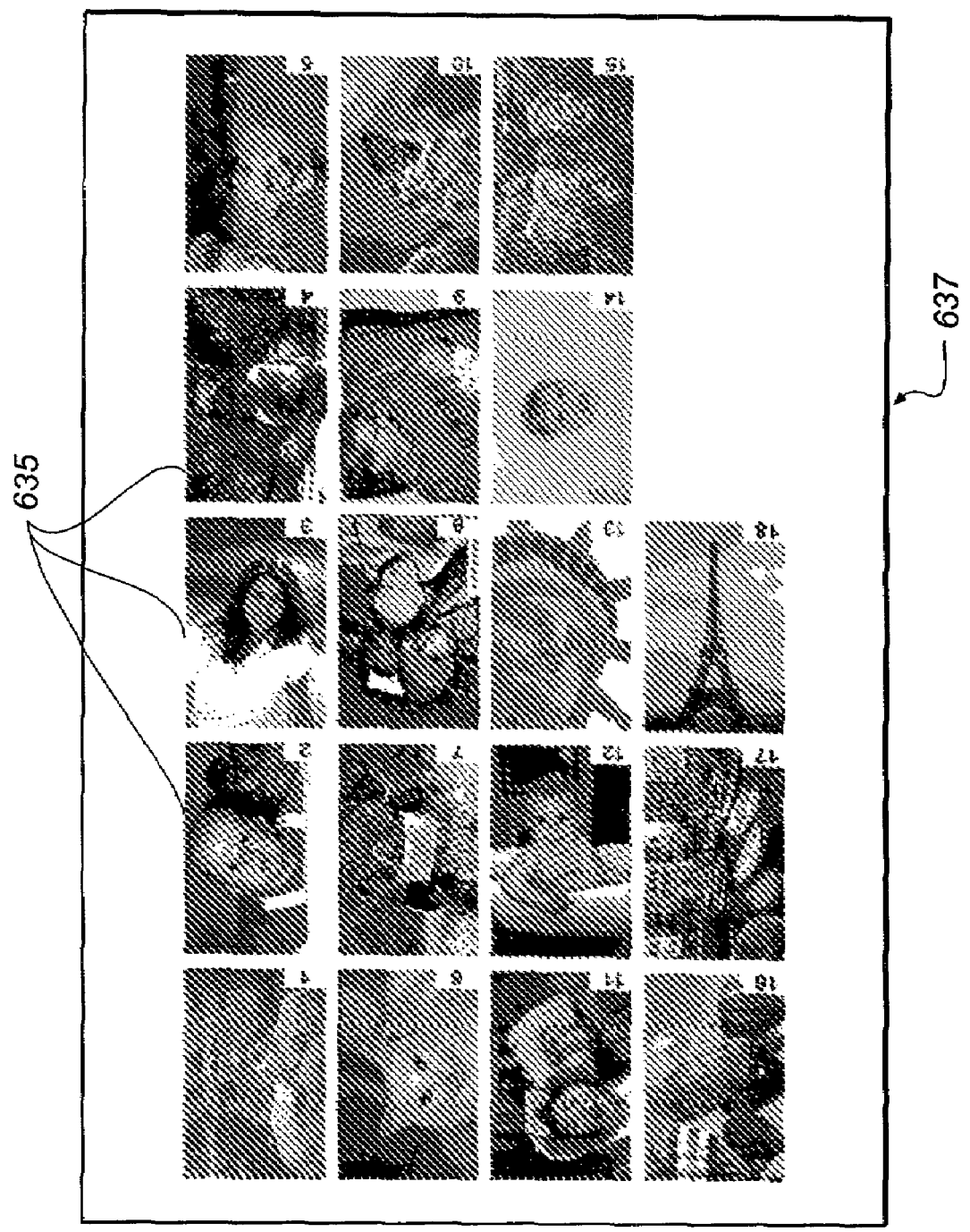

With respect to the comparison print, as described above and shown in FIGS. 5A and 5B, an enhanced image 601 and a service or unenhanced image 602 of the same image can be printed on a comparison print 600. To more clearly show the enhancements to the customer, the images can be printed on the same sheet within close proximity to each other as shown in FIG. 5A, or can be printed in a side by side basis as shown in FIG. 5B. In the example of FIGS. 5A and 5B, comparison print 600 is generally the same size as the service print to ensure that the prints fit within a standard packaging. Print 600 can further include an informational portion or section 604 which permits the insertion of an informational message pertinent to at least the enhanced image. However, the present invention is not limited thereto, and it is recognized that as a further option the comparison print with the enhanced image(s) can be provided on an index print 625 as shown in FIG. 5C. In the example of FIG. 5C and with further reference to FIG. 5D, an unenhanced image 627 (FIG. 5D) could be provided as a standard print, and an enhanced image 629 could be provided on index print 625 as shown in FIG. 5C. As a still further option, you can have an order in which unenhanced images 630 are printed on one index print 632 (FIG. 5E) and enhanced images 635 are printed on a second index print 637 (FIG. 5F). With respect to placing the enhanced images on the index print, this arrangement would be specifically advantageous for corrections involving color balance or underwater prints, where the corrections can be easily detected.

In the examples of FIGS. 5A-5F, the enhancement relates to contrast correction. Using FIG. 5A as an example, in the unenhanced image 602, the image of the boy 900 in the picture has been corrected for contrast. This correction is easily seen in enhanced image 602 in a manner which permits the viewer to quickly appreciate the advantages of the enhanced image. Of course, contrast corrections are only shown as an example, and as already described, the enhancements can be directed to a variety of characteristics such as red-eye, sharpness, under exposure, over exposure, scratches, noise, etc.

As a still further option, multiple comparisons on one print can be shown on a single sheet to show a plurality of corrected images versus their uncorrected counterparts on one print.

Therefore, with a specific order, you can have a product which includes an index print followed by a service print, followed by comparison print 600 having some information or messages thereon which can provide the customer with, for example, information on how the print has been enhanced. For example, the information can include a score indicative of the amount that the print has been enhanced or can simply say that the print has been enhanced to correct, for example, red-eye, tone, etc.

As a still further option, in addition to or as an alternative to providing an enhanced comparison image side by side with the standard image on a comparison print, as described above, the print can be provided with circles or highlights around only those areas which have been corrected on the comparison print.

The enhanced print including the informational message can also include an icon representative of corrections that have been made, for example, a red-eye icon.

As a still further option, with respect to the comparison print, only a portion of the comparison print, for example, a person's head which has been enhanced can be shown for comparison with the unenhanced image.

Figure 6B:
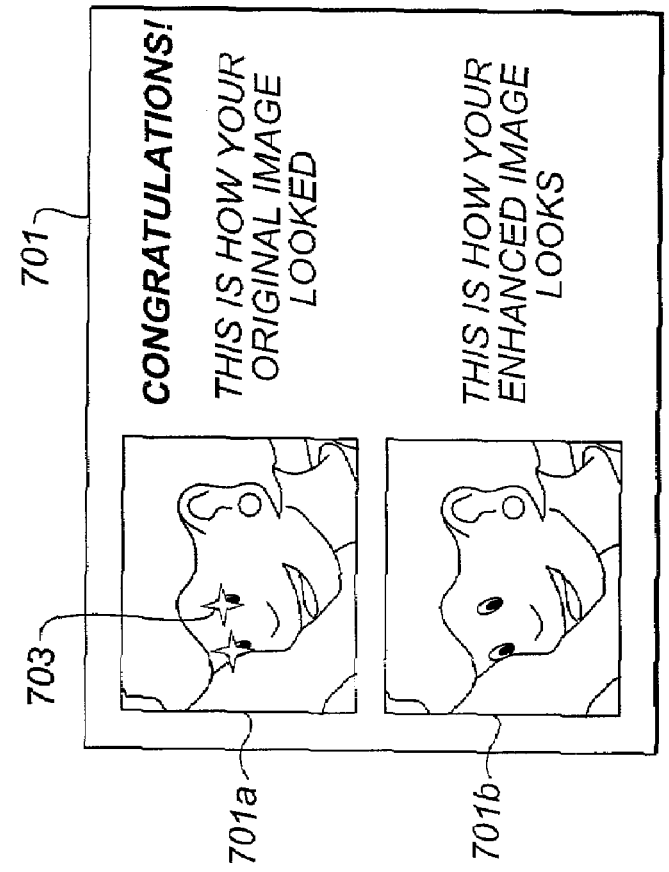
FIGS. 6A-6B are still further examples of comparison prints.
Figure 6A:
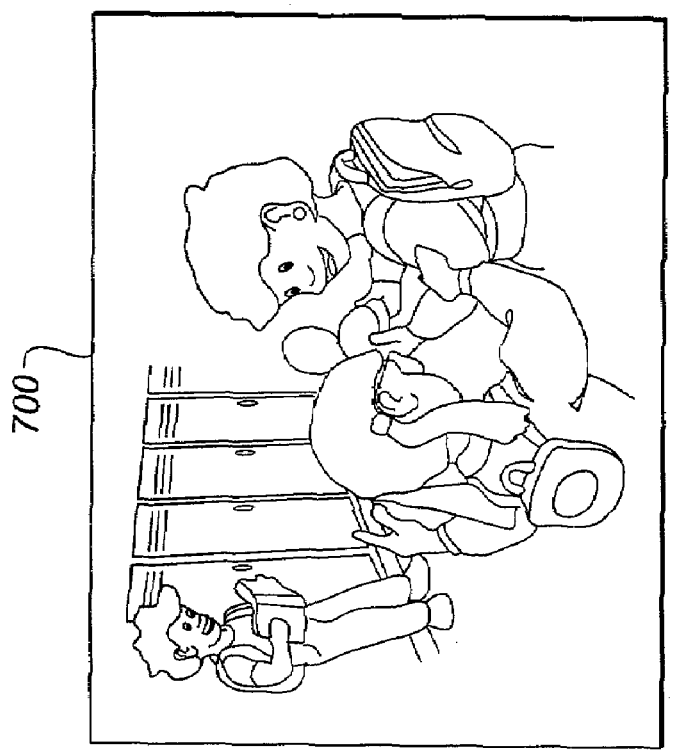

That is, with reference to FIGS. 6A and 6B, the completed order provided to the customer can include an enhanced print 700 (FIG. 6A) and a further print 701 (FIG. 6B) which highlights those areas which have been corrected in the enhanced print. In the example of FIGS. 6A, 6B, red-eye was detected in the original image. The enhanced print of FIG. 6A has been corrected for red-eye, while the comparison print of FIG. 6B includes an original version 701a of the image (in this case only the head of the image) which shows red-eye 703, and a digitally enhanced version 701b of the image (again only the head as shown) which has been corrected for red-eye.

Of course, modifications of the version shown in FIG. 6A and 6B are possible within the scope of the present application. More specifically, rather than showing the head of the image to highlight the correction of red-eye, the entire image can be shown in the format shown in FIG. 6B while highlighting the red-eye from the original image and showing how the red-eye has been corrected in the enhanced image. Additionally, the example of FIGS. 6A and 6B has been shown using red-eye as an example, however, the same concept applies to any other corrections which may have occurred. More specifically, if there are areas where sharpness has been corrected, the highlights can point out those specific areas.

Further, although the present invention speaks of providing for an enhanced image in which the image has been rendered to correct, for example, red-eye, it is noted that the images can be displayed or printed to show different levels of enhancements. More specifically, the images can be corrected or enhanced to different levels or values based on, for example, the characteristics noted above. As a still further option, two versions of an enhanced image can be presented. That is, you can have a first rendering of an image that is enhanced to a first level and a second rendering of the same image that is enhanced to a second level. Both images can be displayed in a side by side manner as discussed above, to visually display the level of corrections to a consumer.

Further, as noted above, the present invention is not limited to providing for the enhanced and unenhanced image for viewing by a consumer on a print. As a still further feature of the invention, the image rendered as originally requested by the customer, and the digitally enhanced image can be sent via, for example, the internet to a customer's computer or to a further location such as a kiosk 503a, for viewing by the customer. With this approach, the customer can electronically order the enhanced version of the image and/or view the advantages of the enhanced image versus the unenhanced image. Thus, the present invention provides a unique system and method in which an image from a customer order is selected for printing or display as an unenhanced image (i.e. as requested by the customer in his/her order), and the same image is printed or displayed as a digitally enhanced image. Therefore, the enhanced image and the unenhanced image can be displayed in a side by side manner on a computer display or a display of a kiosk. This permits a consumer to clearly distinguish and recognize the advantages of enhancement or correction algorithms which are possible with, for example, digital systems.

Although the present invention speaks of photofinishing and refers to photosensitive film, the present invention is applicable to various media such as inkjet media, and thermal media.

In a feature of the present invention, the enhanced image and the unenhanced image can be printed on a single sheet as shown in FIGS. 5A and 5B. Of course, the present invention is not limited thereto, and the enhanced and unenhanced image can also be provided on separate prints within an order, with the prints being preferably positioned one after the others so as to permit a consumer to quickly view one image relative to the other. Thus, the comparison print can be printed inline with the service print. As a further option, the comparison print having at least the enhanced image can be printed offline (i.e., at remote printer 503b) while the service prints having the unenhanced images can be printed at another printer (i.e., printer 503).

Therefore, in the system of the present invention, and with reference to FIG. 4, image data manager 501 will be adapted to receive image data representative of a custom image order and select at least one image from the customer order for rendering as both an unenhanced image and as a digitally enhanced image. The image data manager can thereafter send the comparison print to a printer for printing, or as a further option, can be operationally communicated with the internet or a kiosk to send the comparison images to a remote location. As a still further option, the unenhanced and digitally enhanced image can be provided on a CD for delivery to a consumer who can then view both images at his home computer.

The present invention further provides for a system for creating a comparison print in which a media has a first portion which includes an unenhanced image and a second portion adjacent to the first portion which includes a digitally enhanced rendering of the same image thereon. The print can include a further section that has an informational message pertinent to at least the digitally enhanced image (see FIG. 4). As previously described, within the context of the present invention, the process of producing a digitally enhanced image, as an example, can comprise changing pixel values to maximize content that is captured either on film or digitally.

Further, although the present invention speaks of a preferred feature of showing the same image rendered as requested by the customer (i.e. unenhanced), and as a digitally enhanced image, the present invention is not limited thereto. For example, the customer image can be rendered as requested or as an unenhanced image, while the digitally enhanced image which is presented to the customer on the comparison print or displayed electronically, can be a third party or (canned) image.

Further, although the invention has been described in relation to showing an enhanced image to a consumer to communicate the advantages of enhancement algorithms, the invention is not limited thereto. The invention is also applicable to orders which already include a request for premium processing services that include digital enhancement features. In this case, an image that has benefited the most from the digital enhancement algorithms can be selected for the comparison print. This same image would also be printed without the benefit of the enhancement algorithms. In this way, the consumer can visually see the benefits of the premium processing services which he/she has ordered.

Therefore, the present invention provides for a system and method which demonstrates the enhancement capabilities of digital printing or premium processing services by utilizing the customer's images to demonstrate the enhancement.

It is to be understood that various other changes and modifications may be made without departing from the scope of the present invention. The present invention being defined by the following claims.

What is claimed is:

1. A method of printing a customer image order, the method comprising the steps of:
    obtaining a digital record of a customer order containing a plurality of images;
    selecting at least one image from said plurality of images where a face is detected for printing as an unenhanced image and as a digitally enhanced image;
    digitally enhancing said at least one image; and
    printing said digitally enhanced image and said unenhanced image.

2. A method according to claim 1, wherein said printing step comprises:
    printing said enhanced image and said unenhanced image on a single print in a side by side relationship.

3. A method according to claim 1, wherein said printing step comprises:
    printing said enhanced image on an index print and printing said unenhanced image on a standard print.

4. A method according to claim 1, wherein said selecting step comprises:
    selecting at least one image from said plurality of images where a flesh tone is detected.

5. A method according to claim 1, wherein said selecting step comprises:
    selecting at least one image from said plurality of images where red-eye is detected in the image.

6. A method according to claim 1, wherein said selecting step comprises:
    selecting said at least one image for enhancement based on characteristics of said at least one image which includes at least one of red-eye, tone scale, under exposure compensation, noise reduction and sharpness.

7. A method according to claim 6, wherein each of said characteristics is assigned a predetermined weighting factor and the selected image for enhancement has a total weighting factor which is above a threshold value.

8. A method according to claim 6, wherein each of said characteristics is assigned a value and said value is used to generate a message or information for a consumer.

9. A method according to claim 1, wherein said unenhanced image is a digitally rendered image to simulate an optical image and said digitally enhanced image is digitally rendered with superior quality to said unenhanced image.

10. A method according to claim 1, wherein said printing step comprises:
    printing the unenhanced image on a first index print and printing the enhanced image on a second index print.

11. A method according to claim 1, wherein said selecting step comprises:
    disqualifying any images from said plurality of images where the image has inappropriate content, high grain, a poorly composed image content, out of focus images, or objectionable image artifacts.

12. A method according to claim 1, wherein said unenhanced image is an optically generated print.

13. A method according to claim 1, wherein said enhanced image is printed on a first print which is printed inline with a second print having said unenhanced image.

14. A method according to claim 1, wherein said enhanced image is printed on a first print by a first printer and said unenhanced image is printed on a second print by a second printer.

15. A method of offering imaging services comprising the steps of:
    selecting at least one image from a customer order for rendering as an unenhanced image and as a digitally enhanced image;
    applying enhancement algorithms to said selected image to create the digitally enhanced image;
    assigning a value representative of an amount of enhancement to said selected image; and
    displaying said unenhanced image and said enhanced image on an electronic display.

16. A method according to claim 15, further comprising:
    providing said unenhanced image and said digitally enhanced image on a CD.

17. A method according to claim 15, wherein said displaying step comprises displaying said unenhanced image and said enhanced image in a side by side manner on the display.

18. A method according to claim 15, wherein said displaying step comprises:
    sending the unenhanced image and the enhanced image to a remote computer for display on the remote computer.

19. A method according to claim 15, comprising the further step of:
    sending information to a remote computer which includes said value.

20. A method according to claim 15, comprising the further step of:
    using said value to generate messages for transfer to a consumer.

21. A method of creating a comparison print comprising the steps of:
    placing an unenhanced image on a first portion of a comparison print; and
    placing a digitally enhanced rendering of the unenhanced image on a second portion of the comparison print, wherein the digitally enhanced rendering is the unenhanced image after adjusting at least one characteristic of red-eye, flesh tone, under exposure compensation, or noise reduction and sharpness as compared to the unenhanced image, wherein each characteristic is assigned a predetermined weighting factor and the digitally enhanced rendering has a total weighting factor which is above a threshold value.

22. A method according to claim 21, wherein said second portion of said comparison print is adjacent to said first portion, to permit a viewer to view and compare the unenhanced image on the first portion of the print and digitally enhanced rendering of the unenhanced image on the second portion of the print.

23. A method of printing a customer image order, the method comprising the steps of:
    obtaining a digital record of a customer order containing a plurality of images;
    selecting at least one image from said plurality of images for printing as an unenhanced image and as a digitally enhanced image, wherein each of the at least one selected image is selected for enhancement based on characteristics of said at least one image which includes at least one of red-eye, tone scale, under exposure compensation, noise reduction and sharpness, wherein each of said characteristics is assigned a predetermined weighting factor, and the at least one image selected for printing as the unenhanced image and as the digitally enhanced image has a total weighting factor which is above a threshold value;

digitally enhancing said at least one image; and printing said digitally enhanced image and said unenhanced image.

24. A method according to claim 23, wherein each of said characteristics is assigned a value and said value is used to generate a message or information for a consumer.

25. A method according to claim 23, wherein said selecting step comprises:

selecting at least one image from said plurality of images where a face is detected.

* * * * *